United States Patent [19]

Weaver et al.

[11] 4,448,302

[45] May 15, 1984

[54] ROLLER CONVEYOR CONSTRUCTION

[75] Inventors: Richard A. Weaver, Linden; James H. Niedzielski, Fenton; John R. Herronen, Linden; Joseph M. Wright, Fenton; Ronald M. Prime, Flint, all of Mich.

[73] Assignee: Prime & Weaver Investment Company, Fenton, Mich.

[21] Appl. No.: 324,142

[22] Filed: Nov. 23, 1981

[51] Int. Cl.³ .............................................. B65G 13/06
[52] U.S. Cl. ..................................... 198/781; 198/780; 193/35 B
[58] Field of Search ............... 198/780, 781, 789, 790; 193/35 B, 35 R; 384/438, 439, 428

[56] References Cited

U.S. PATENT DOCUMENTS 2,077,190  4/1937  Rishel .............................. 193/35 B
2,769,515 11/1956  Thomas et al. .
3,915,275 10/1975  Specht ............................. 193/35 R Primary Examiner—Joseph E. Valenza
Assistant Examiner—Kyle E. Shane
Attorney, Agent, or Firm—Learman & McCulloch

[57] ABSTRACT

A roller conveyor construction has a plurality of longitudinally spaced rollers through each of which extends a shaft journaled at its opposite ends in journal supports which are slideably mounted between a pair of support members for linear movement in a vertical plane only. The journal support for each roller preferably is equipped with yieldable and adjustable suspension means and each roller may include an adjustable, overload clutch drive mechanism.

11 Claims, 3 Drawing Figures

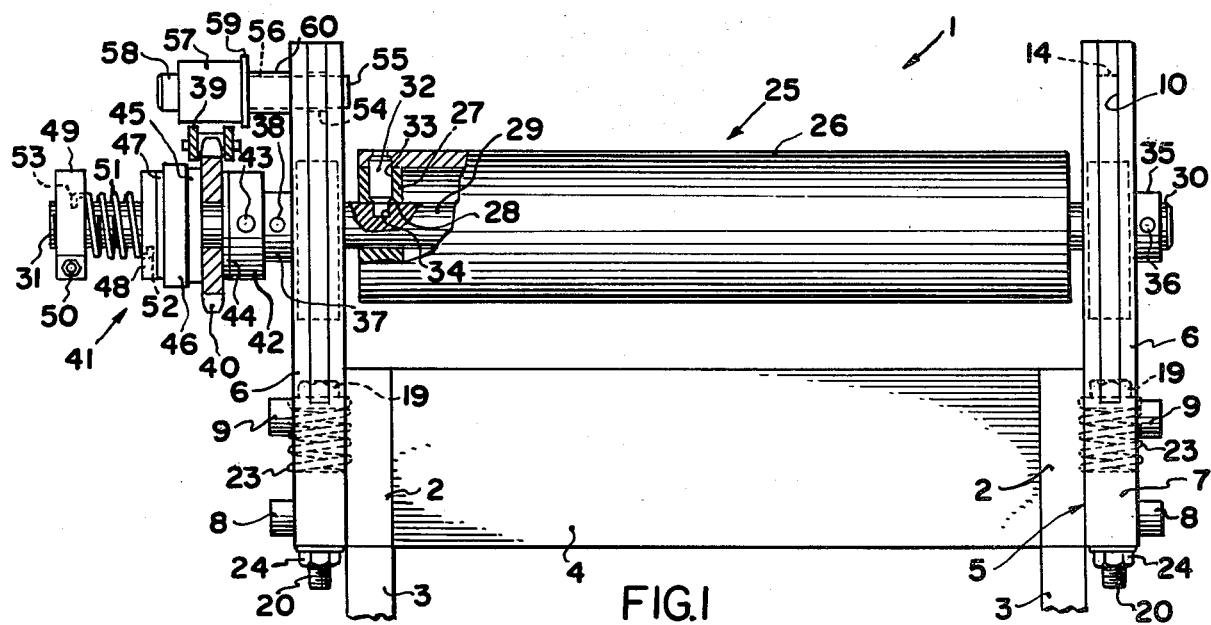

ROLLER CONVEYOR CONSTRUCTION

BACKGROUND OF THE INVENTION

In the transfer of articles from place to place it is common to use roller conveyors. Some conveyors include rollers which are not powered, whereas other conveyors use rollers which are powered. In either case it is desirable that the upper surfaces of adjacent rollers be coplanar so that each roller may support an equal share of a load and so that passage of an article along the conveyor does not tend to jar the article or shift a roller due to its being at a level higher than the adjacent rollers. It also is desirable that the rollers be capable of yielding when subjected to sudden shock, such as by the dropping of a heavy object onto the conveyor, thereby preventing premature failure of the rollers' bearings.

In those instances in which some or all of the rollers of a conveyor are powered it often is advantageous to include as part of the drive mechanism a clutch which normally transmits rotation from the driver to the roller, but which under certain circumstances permits relative rotation between the driver and the roller. Such an arrangement enables a conveyor to be used as an asynchronous conveyor.

Typical of known conveyors possessing some of the above characteristics are those disclosed in U.S. Pat. Nos. 2,396,079; 2,712,377; and 2,769,515.

One of the disadvantages of known roller conveyor constructions is that they conventionally are manufactured in special lengths and widths for the conveying of specific objects. As a consequence, it is rarely feasible to produce and stockpile component parts of a conveyor and from which different size conveyors can be fabricated. In addition, the shortening or lengthening of conventional conveyors, after initial installation, poses many problems which may be eliminated or minimized by the present construction.

SUMMARY OF THE INVENTION

A roller conveyor constructed in accordance with the invention comprises a plurality of individual rollers having at each end thereof an axially projecting shaft that is adapted to be accommodated in a journal which, in turn, is accommodated in a journal support. Each journal support is adapted to be fitted between a pair of spaced support members, each of which is vertically slotted or grooved for the slideable reception of a journal support, thereby enabling each journal support to move linearly in a vertical plane only. Each journal support carries height adjusting means which reacts with one of the fixed support members to enable the height of the associated roller to be adjusted. In addition, each journal support includes a yieldable or spring suspension which enables the associated roller to be deflected momentarily and thereby absorb the shock of being struck by a heavy object.

In those instances in which one or more rollers of the conveyor are to be driven, the shaft at one end of a roller may be extended to accommodate a sprocket wheel or pulley for engagement by a motor driven belt or chain. In those instances in which an asynchronous conveyor is desired, the driving mechanism for each driven roller may include a spring loaded clutch which normally transmits driving power from the belt or chain to the roller shaft, but which is capable of slipping should the roller be restrained against rotation.

DESCRIPTION OF THE DRAWINGS

A roller conveyor construction incorporating the advantages and features referred to above is disclosed in the accompanying drawings in which:

FIG. 1 is an end elevational view, with parts broken away, of a conveyor constructed in accordance with the preferred embodiment of the invention;

FIG. 2 is a fragmentary, side elevational view; and

FIG. 3 is an enlarged, top plan view of a portion of the apparatus as viewed in the direction of the arrows 3—3 of FIG. 2.

DETAILED DESCRIPTION

A roller conveyor constructed in accordance with a preferred embodiment of the invention is designated generally by the reference character 1 and comprises a pair of spaced apart, parallel, horizontal, elongate frame members 2 mounted on suitable supports 3 joined at intervals by cross bars 4. At uniformly spaced intervals along each frame member 2 is a plurality of L-shaped support members 5, each of which is identical and each of which has a longer leg 6 and an integral shorter leg 7. Each shorter leg lies alongside the outboard face of the associated frame member 2 and is secured thereto by a bolt 8 which extends through openings formed in the members 2 and 7. Each of the longer legs 6 also is secured to the associated frame member 2 by a bolt 9 which extends through openings formed in the members 2 and 6.

Each of the longer legs 6 of each support member 5 has a vertical groove or slot 10 in one end surface thereof, such groove extending vertically from the free end of the leg 6 to a base 11 located at a level below the upper surface of the associated frame member 2 and adjacent the associated bolt 9. The opposite surface of each longer leg 6 has an identical slot or groove 12 therein which terminates at its lower end in an identical base 13.

As is best illustrated in FIG. 2 each support member 5 is independent of every other support member and is fixed to the associated frame member 2 in such manner as to provide a space S of uniform dimension between each adjacent support leg 6. Spanning each such space S and snugly, but slideably, accommodated in the confronting grooves 10 and 12 is a journal support 14 having therein an opening 15 in which an outer journal or bearing race 16 is mounted for universal adjustment. An inner journal or bearing race 17 is accommodated within the outer race 16 for a purpose presently to be explained.

Welded or otherwise fixed to the lower surface of each journal support 14 is the head 19 of a threaded bolt 20 which extends through a vertical bore 21 formed in the shorter leg 7 of the associated support member 5. Abutting the bolt head 19 is a washer 22 against which seats one end of a yieldable compression spring 23, the opposite end of which seats on the leg 7. An adjusting nut 24 threaded onto the free end of the bolt 20 enables the associated journal support 14 to be adjusted vertically relative to the associated support members 5, thereby prestressing the spring 23.

In the disclosed embodiment the conveyor includes a plurality of cylindrical rollers 25 each of which comprises a cylinder 26 at each end of which is a wall 27 having a bore 28 therein. Extending through each bore is an elongate shaft 29 which is of such length that one end 30 extends beyond one end of the cylinder 26 and the opposite end 31 extends beyond the other end of the cylinder 26. A locking screw 32 extends through the cylinder 26, through an opening 33 in the wall 27, and into an opening 34 in the shaft 29 so as to lock the cylinder 26 and the shaft 29 together for conjoint rotation.

The end 30 of the shaft 29 extends snugly through the inner race 17 of one of the journal supports 14 and has fixed to its projecting end a collar 35 by means of a set screw 36. The opposite end 31 of the shaft 29 extends through the inner race 17 of another journal support 14 and receives a similar collar 37 that is fixed to the shaft by a set screw 38.

In the illustrated embodiment each roller 25 is adapted to be driven by an electric, hydraulic, or other motor (not shown) via a sprocket chain 39 arranged in the manner illustrated in U.S. Pat. No. 2,712,377, for example, and in driving engagement with a sprocket wheel 40 which is mounted on the projecting end 31 of the shaft 29 for rotation relative thereto.

A spring loaded clutch mechanism 41 is adapted to transmit driving force from the sprocket wheel 40 to the roller 25 and includes a backing ring 42 fixed to the shaft extension 31 by a lock screw 43 and against which seats an annular thrust bearing 44 which also bears against one side of the hub 45 of the sprocket wheel 40. Bearing against the opposite side of the hub 45 is a ring 46 against which bears an annular thrust bearing 47 which also is engaged by a ring 48.

The terminal end portion 31 of the shaft 29 is exteriorly threaded for the accommodation of a correspondingly threaded clamp ring 49 which may be fixed in axially adjusted position on the shaft by a clamp screw 50. Extending between the ring 48 and the clamp 49 is a force transmitting torsion spring 51 having a tang 52 at one end that is accommodated in an opening formed in the ring 48 and having a similar tang 53 at its opposite end accommodated in an opening in the clamp 49. The force exerted by the spring 51 on the ring 48 depends upon the distance between the ring and the clamp 48, the arrangement being such that the spring force varies inversely with the spacing between the members 48 and 49.

The construction and arrangement of the clutch mechanism 41 are such that the members 40, 44, 46, 47, and 48 are maintained in stacked, face-to-face engagement by the spring 51 and under sufficient frictional force to enable rotation of the sprocket wheel 40 normally to be imparted to the shaft 29 and, thus, to the roller 25. If the roller 25 should be restrained against rotation, however, the sprocket wheel 40 may continue to be rotated by the chain 39 but the shaft 29 will now rotate. Instead, the thrust bearings 44 and 47 will permit relative rotation between the sprocket wheel 40 and the shaft 29.

In some cases it may be desirable to utilize a guard to prevent inadvertent separation of a drive belt or chain from the associated pulley or sprocket wheel. In this event each associated journal support 14 may be provided with an opening 54 for the accommodation of the threaded shank 55 of a bolt 56 having a roller 57 overlying the sprocket wheel 40 and retained between the bolt head 58 and a flange 59 carried by a spacer 60 which encircles the bolt 56.

All of the various parts referred to above may be stockpiled so as to enable a roller conveyor of any desired length to be fabricated. To fabricate a conveyor the frame members 2 and 4 may be fitted to appropriate supports 3 and the desired number of support members 5 secured to the frame members 2. Each roller 25 may be assembled with a pair of journal supports 14 and the latter slid vertically into the spaces S. If the rollers of the conveyor are not to be driven, the shafts 29 may be replaced by shorter shafts from which the sprocket wheel 40 and the clutch mechanism 41 are omitted. On the other hand, if the conveyor is to have powered rollers, but no clutches, then the sprocket wheel 40 may be keyed to the shaft 29 and the clutch 41 omitted.

Following assembly of the several parts of the conveyor the height of each roller 25 may be adjusted, by manipulation of the associated nut 24, so that the upper surfaces of all rollers are coplanar. Thus, each roller will be capable of supporting its share of any load passing along the conveyor.

Depending upon the number and spacing of the rollers 25, and depending upon the capacity of the spring 23 and the weight of an object traversing the conveyor, it is possible that a leading edge of an object may occupy a level slightly below that of the upper surface of a roller in the path of, but not engaged by, such article. In such event the resilient suspension and the slideable fit between the journal supports 14 and the support members 5 will enable the roller to be deflected downwardly, but the roller will not be displaced longitudinally of the conveyor.

The resilient suspension of each roller 25 also enables the shocks of heavy objects being dropped onto the conveyor to be absorbed by the spring 23, thereby avoiding damaging of the roller bearings.

A conveyor constructed in accordance with the invention may be lengthened simply by adding two support members 5 (one at each side of the conveyor) for each roller 25 that is to be added, it being understood that, in the case of a driven roller, an extension of the driving chain or belt also will be made. Similarly, if an existing conveyor is to be shortened, two support members 5 may be removed, along with each removed roller.

The disclosed embodiment is representative of a presently preferred form of the invention, but is intended to be illustrative rather than definitive thereof. The invention is defined in the claims.

We claim:

1. Roller conveyor apparatus comprising a main frame; a first plurality of independent, uniformly spaced apart support members individually fixed to and upstanding from said frame and extending along one side thereof; a second plurality of independent, uniformly spaced apart support members individually fixed to and upstanding from said frame and extending along its opposite side parallel to and spaced from said first plurality of support members, the space between each adjacent pair of said support members on the same side of said frame being uniform and upwardly unobstructed; a plurality of rollers each of which has a mounting shaft projecting beyond its opposite ends, each of said rollers being of such length as to be accommodated between any selected pair of said first and second pluralities of support members on opposite sides of said frame; journal means fitted to each of said shafts outboard of the associated roller; and a journal support for each of said journals, each of said journal supports having a uniform width enabling it to span the space between any adjacent two of said support members on the same side of said frame, each of said journal supports being mounted on and between each of two adjacent support members on the same side of said frame for linear sliding movements in a vertical plane only.

2. Apparatus according to claim 1 including adjustable means reacting between each of said journal supports and one of the associated support members for adjusting such journal support in said vertical plane.

3. Apparatus according to claim 1 wherein said mounting means enables sliding relative movement between each journal support and its associated pair of support members.

4. Apparatus according to claim 3 wherein each support member of each adjacent pair of support members on the same side of said frame is grooved and is so arranged that the groove in one support member of such pair confronts the groove in the other support member of such pair, and wherein each of said journal supports is fitted into the confronting grooves of the associated pair of support members.

5. Apparatus according to claim 1 including resilient means acting on each of said journal supports for yieldably urging the latter vertically upwardly, and further including means for limiting upward movement of such journal support by said resilient means.

6. Apparatus according to claim 5 wherein said resilient means comprises a compression spring reacting between said journal support and one support member of its associated pair of support members.

7. Apparatus according to claim 1 wherein each of said support members is L-shaped having its shorter leg fixed to said frame and its longer leg supporting the adjacent journal support.

8. Apparatus according to claim 1 including drive means connected to the shaft at one end of said roller for rotating the latter.

9. Apparatus according to claim 8 wherein said drive means includes clutch means for enabling relative rotation between said drive means and said roller.

10. Apparatus according to claim 5 wherein said limiting means is vertically adjustable and reacts between the associated journal support and one of the associated support members to vary the compression of said spring.

11. Apparatus according to claim 7 wherein the longer leg of each of said support members is grooved on each of two opposite sides thereof whereby each of said longer legs provides partial support for two of said journal supports.

* * * * *